US00RE33920E

United States Patent [19]

Tanguay et al.

[11] E Patent Number: Re. 33,920

[45] Reissued Date of Patent: May 12, 1992

[54] SMOKE DETECTOR HAVING VARIABLE LEVEL SENSITIVITY

[75] Inventors: William P. Tanguay, Downers Grove; James McCrink, Lisle, both of Ill.

[73] Assignee: Seatt Corporation, Downers Grove, Ill.

[21] Appl. No.: 390,713

[22] Filed: Jul. 11, 1989

Related U.S. Patent Documents

Reissue of:

[64] Patent No.: 4,792,797
Issued: Dec. 20, 1988
Appl. No.: 22,099
Filed: Mar. 5, 1987

[51] Int. Cl.[5] ..... G08B 17/10

[52] U.S. Cl. ..... 340/628; 340/577; 340/629

[58] Field of Search ..... 340/628, 577, 629, 630, 340/584, 586, 587, 578, 579, 574-577, 627; 250/308, 310, 573

[56] References Cited

U.S. PATENT DOCUMENTS

| | | | |
|---|---|---|---|
| 4,097,850 | 6/1978 | Confortti | 340/629 |
| 4,101,046 | 7/1978 | Malinowski | 340/630 |
| 4,151,522 | 4/1979 | Yamauchi | 340/628 |
| 4,222,046 | 9/1980 | Pinckaers et al. | 340/629 |
| 4,300,133 | 12/1981 | Solomon | 250/574 |
| 4,313,110 | 1/1982 | Subulak et al. | 340/628 |
| 4,335,378 | 6/1982 | Coleman | 340/629 |
| 4,383,251 | 5/1983 | Perelli et al. | 340/628 |
| 4,401,979 | 8/1983 | Dobrzanski | 340/629 |
| 4,477,798 | 10/1984 | Saul et al. | 340/628 |
| 4,543,815 | 10/1985 | Troup et al. | 73/28 |
| 4,567,477 | 1/1986 | Cormier | 340/628 |
| 4,568,924 | 2/1986 | Wüthrich et al. | 340/628 |
| 4,600,314 | 7/1986 | Theriault | 340/628 |

OTHER PUBLICATIONS

"Liefsaver Smoke Alarm" Owners Manual Sep. 1986; Fyrnetics Inc.; Elgin Ill. 60120.

"Lifesave Smoke Alarm" Owners Manual Jun. 1988; Fyrnetics Inc.

*Primary Examiner*—Jin F. Ng
*Assistant Examiner*—Jill Jackson
*Attorney, Agent, or Firm*—Niro, Scavone, Haller & Niro

[57] ABSTRACT

A smoke detector having variable sensitivity to smoke levels and using one button both to test the smoke detector and actuate a mode of diminished sensitivity to smoke levels. The smoke detector is operable in a normal sensitivity mode and a diminished sensitivity mode with rapid switching between the modes. The sensitivity to smoke levels is substantially constant when in either the normal or diminished sensitivity mode.

38 Claims, 4 Drawing Sheets

FIG. 3
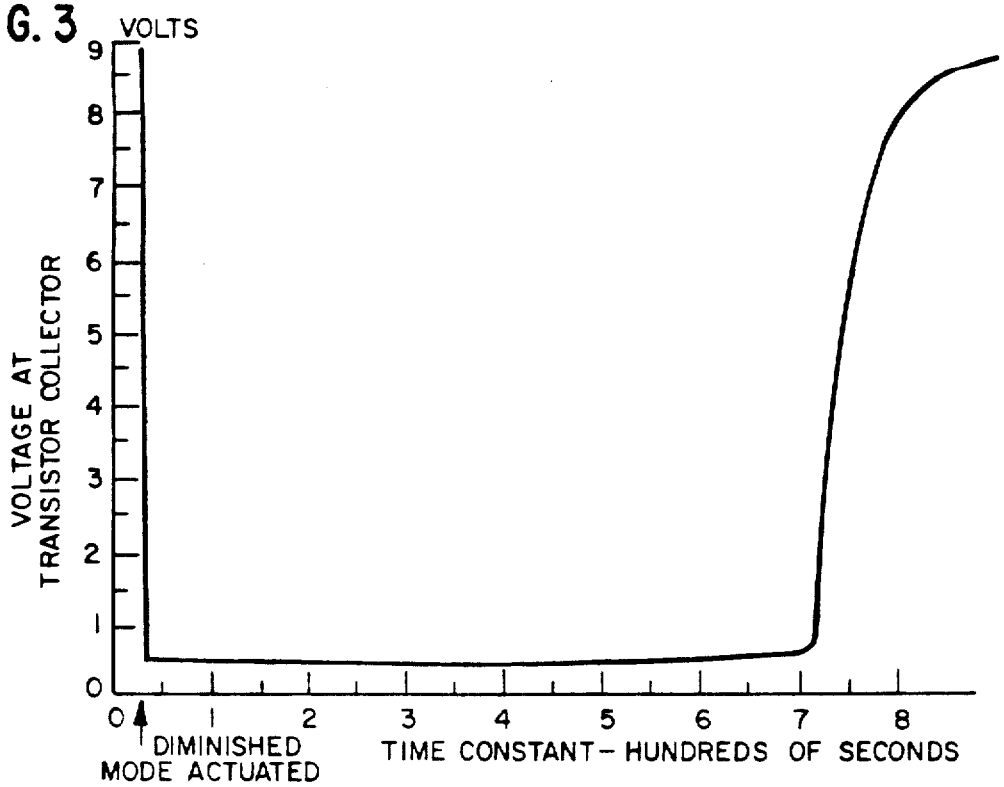
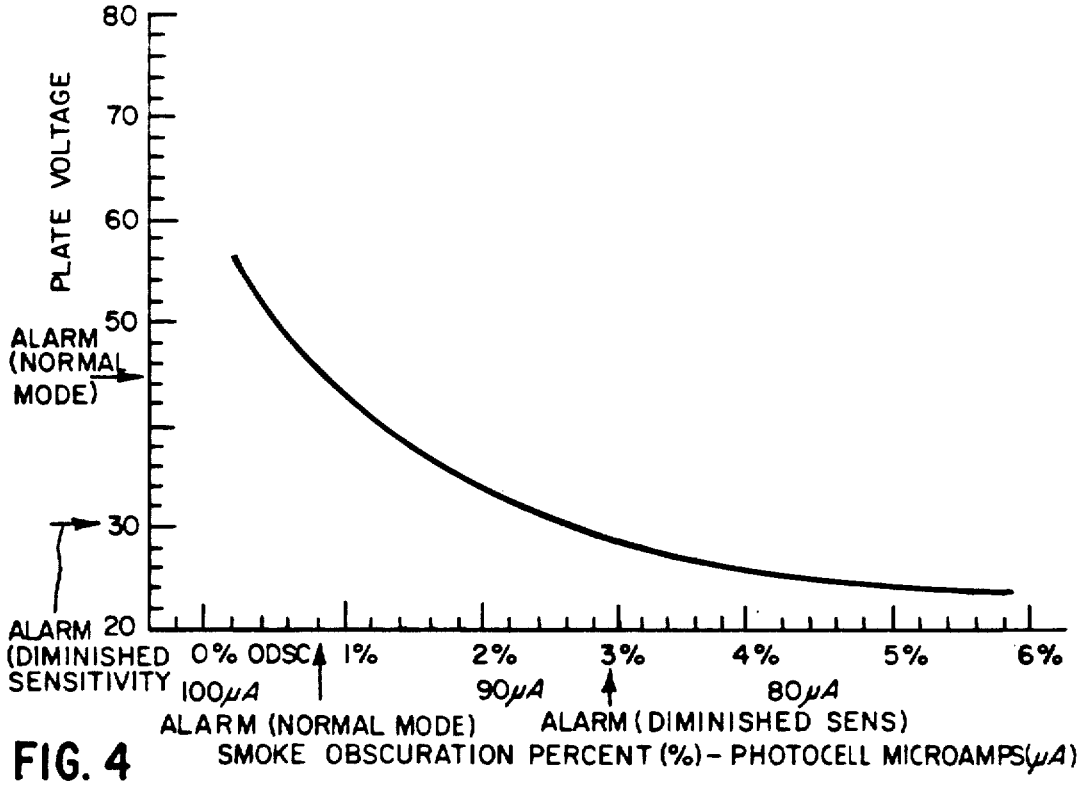
FIG. 4

SMOKE DETECTOR HAVING VARIABLE LEVEL SENSITIVITY

Matter enclosed in heavy brackets [ ] appears in the original patent but forms no part of this reissue specification; matter printed in italics indicates the additions made by reissue.

The present invention relates generally to a smoke detector having the ability to temporarily change its sensitivity to smoke levels. More particularly, the invention is concerned with a smoke detector [have] *having* a single button to test the smoke detector and also to activate a temporary period of diminished sensitivity to smoke levels. The change from diminished sensitivity to normal sensitivity operation is also characterized by a rapid switching from one smoke sensitivity level to the other.

Various smoke detectors include the ability to operate for a short time in a silent mode during which the smoke detector is rendered inoperative in order to avoid false alarms associated with smoke from cooking or from persons smoking. Other units are not rendered totally inoperative but have a rapidly changing level of smoke sensitivity over a temporary period of diminished smoke level sensitivity. Furthermore, current smoke detectors having these features do not allow testing of the operability of the smoke detector during the silent period, and currently available smoke detectors generate an unpleasant beeping sound during the silent operational mode. Also, such smoke detectors have different buttons to test the unit and to actuate the silent mode of operation. Such units have substantial disadvantages to the user including, (a) the user can mistakenly push the test button generating an alarm signal (b) the user can inadvertently push the test button of a failed smoke detector causing the user to falsely believe the silent mode has been activated, (c) the user can even be confused as to the function of each of the two buttons, or (d) the user can inadvertantly push the silence button of a smoke detector, not get a response, and then push the test button and additionally not get a response since the unit been previously silenced, which can substantially confuse the user and make him think the detector has failed.

BRIEF SUMMARY OF THE INVENTION

One of the primary objects of the invention is to provide an improved smoke detector having a single button for both testing [operabiilty] *operability* of the smoke detector and also for actuating an operational mode of diminished sensitivity to smoke levels.

It is another object of the invention to provide a novel smoke detector having a single button for both actuating a mode of diminished smoke level sensitivity and for testing the smoke detector while overriding the diminished sensitivity mode during the testing mode.

It is further object of the invention to provide a novel smoke detector operable in a mode of normal sensitivity to smoke levels and in a mode of diminished sensitivity to smoke levels, the sensitivity remaining substantially constant throughout at least a majority of the time period in the diminished sensitivity mode.

It is an additional object of the invention to provide a novel smoke detector operable for a temporary time period in a mode of diminished sensitivity to smoke levels and at the end of the temporary time period the detector switches rapidly to the normal mode of operation.

It is an object of the invention to provide an improved smoke detector operable for a temporary time period in a mode of diminished sensitivity to smoke levels with the smoke alarm remaining quiet unless the smoke level exceeds an increased predetermined smoke level.

A feature of the smoke detector in accordance with the invention lies in the provision of a single user button or switch for controlling both testing of the smoke detector and for actuating a mode of temporarily diminished sensitivity to smoke levels. Testing of the smoke detector can be performed at all times, overriding if necessary the mode of diminished sensitivity to smoke levels. During this mode of diminished sensitivity the smoke detector still acts to sense and provide an alarm for the presence of smoke levels exceeding a predetermined smoke level which is increased over the normal mode alarm smoke level.

During the mode of diminshed sensitivity to smoke levels, the precise amount of smoke level sensitivity is maintained constant over at least a majority of the temporary time period during which the diminished sensitivity mode is operative. At the end of the temporary time period the smoke detector switches rapidly back to the normal sensitivity mode of operation.

Further objects and advantages of the present invention, together with the organization and manner of operation thereof, will become apparent from the following detailed description of the invention which taken in conjunction with the accompanying drawings wherein like reference numerals designate like elements throughout the several views.

BRIEF DESCRIPTION OF THE DRAWINGS

FIG. 3 shows a control signal plotted as a function of time illustrating the signal level of the sensitivity control element during the normal smoke detector mode and during the temporary period of diminished sensitivity smoke level;

FIG. 4 illustrates voltage on the collector plate versus smoke obscuration percentage.

DESCRIPTION OF PREFERRED EMBODIMENTS

Figure 1:
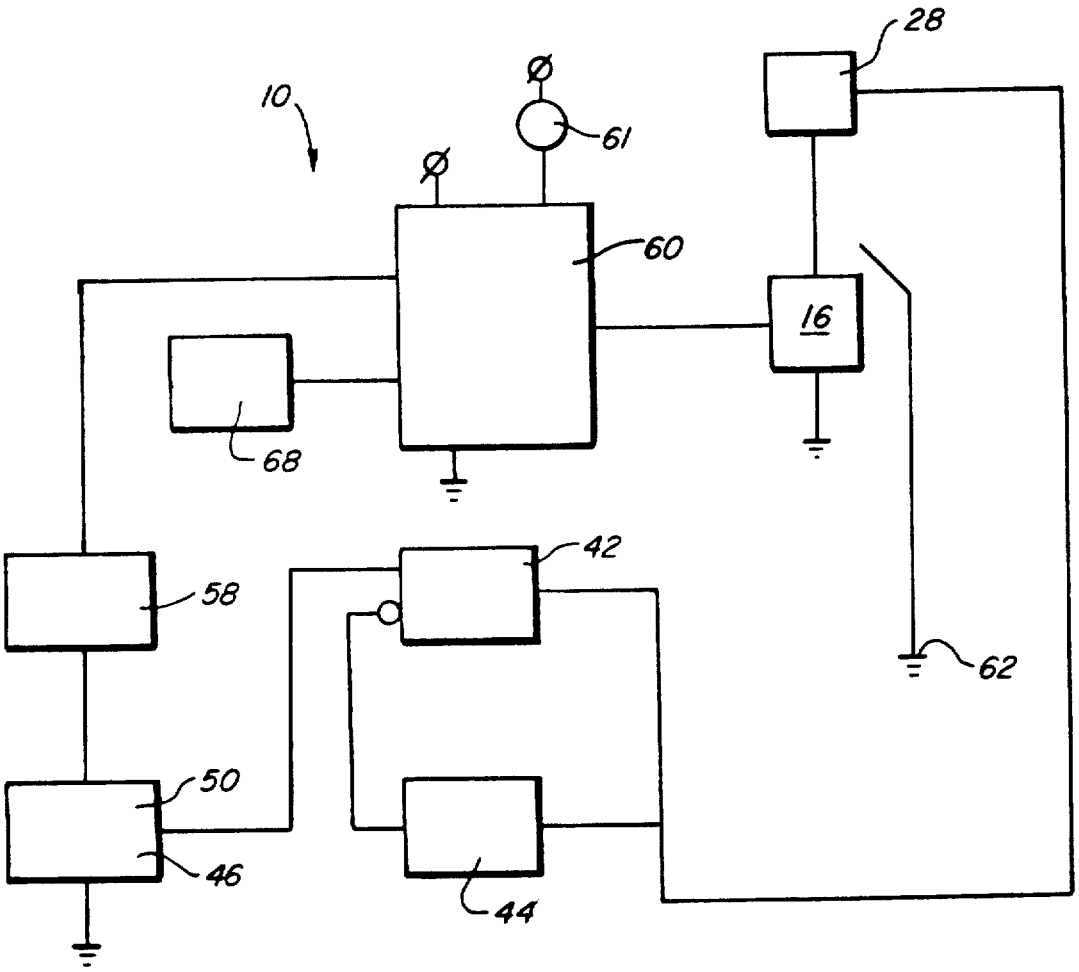
FIG. 1 is a block diagram of a smoke detector constructed in accordance with one embodiment of the invention.
Figure 2:
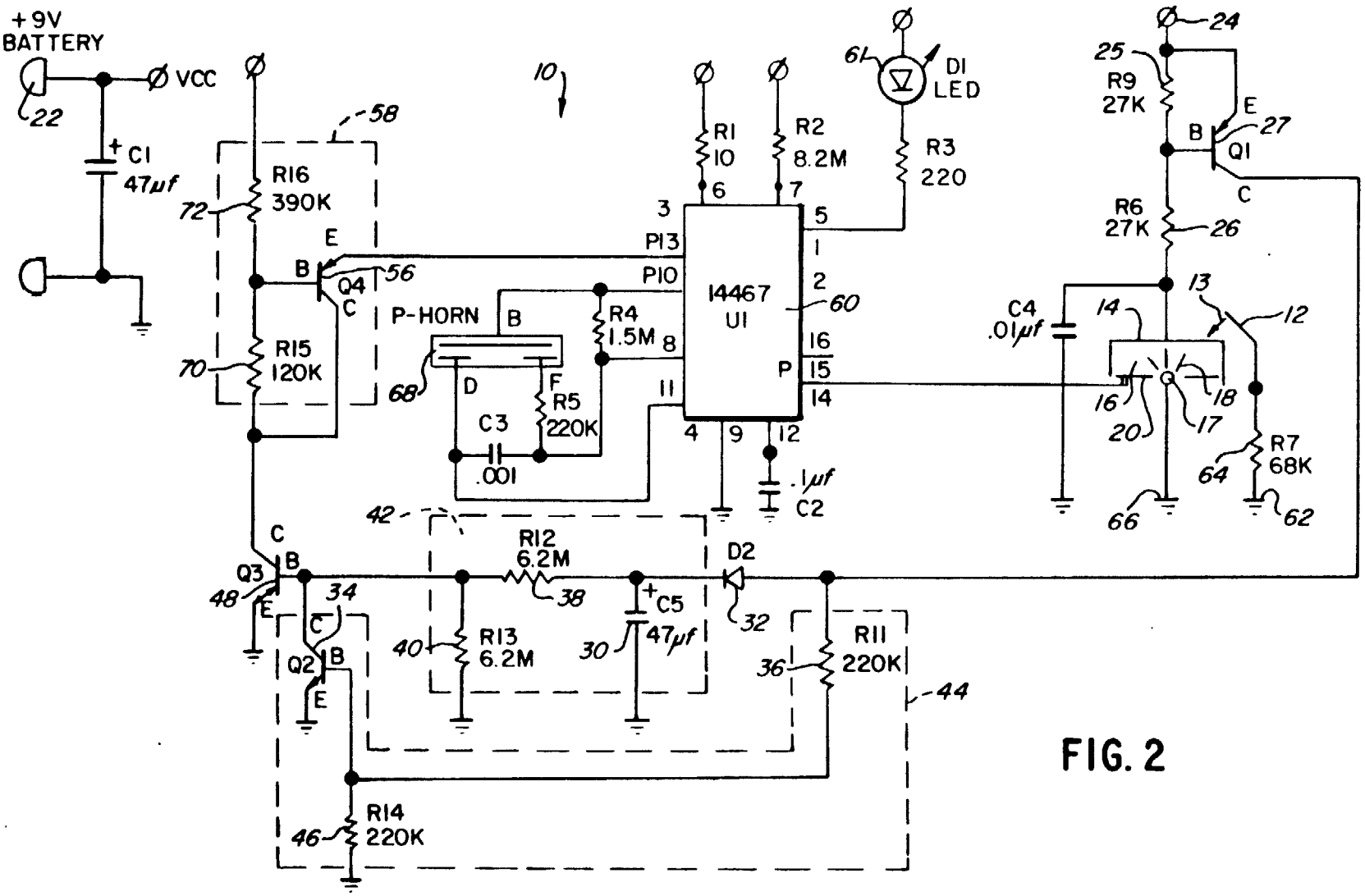
FIG. 2 is an electrical circuit diagram of one form of the invention.

Referring now to the drawings and in particular to FIGS. 1 and 2, a smoke detector constructed in accordance with one embodiment of the present invention is indicated generally at 10. The smoke detector 10 includes a single element, such as a switch 12, which can be used to interact with the smoke detector 10 by user actuation of the switch 12. The switch 12 is moved along the direction of arrow 13 into contact with a container 14 defining an ionization chamber 16. The ionization chamber 16 is one [exampe] *example* of means for sensing smoke levels and is a conventional unit having an Americium isotope source 17 ($Am^{241}$) supplied by Nuclear Radiation Development, Buffalo, N.Y. The isotope source 17 emits alpha particles designated as 18, and the ionization chamber 16 is vented to admit smoke. The alpha particles 18 ionize the atmosphere in the ionization chamber 16 in a known manner, providing a conductive path between the container 14 and the isotope source 17. The voltage at collector plate 20 is potentiometrically divided between the voltage at the container 14 and the isotope source 17. It is a design convenience that the isotope source 17 also functions as one conductive terminal of the ionization chamber 16. The introduction of smoke into the ionization chamber 16 causes the voltage at the collector plate 20 to change in a known manner (see FIG. 4) such that the voltage is a function of the smoke [levels] *level* in the ionization chamber 16. In FIG. 4 the photocell used for measuring the smoke obscuration level (as required by Underwriters Laboratory Standard 217) is manufactured by Weston Instruments, Model No. 594R.R. Another example of conventional sensing means is a photoelectric sensor system.

When the user wishes to test the operability of the smoke detector 10, the user moves the switch 12 into contact with the container 14; and approximately 90 microamps current flows from a battery 22 having input terminal 24. This current flows through resistor 25 in parallel with [a resistor 26 and] the base-emitter (B-E) junction of a transistor 27 *and into resistor 26.* About seventy-two micro amps of current flows into the base-emitter (B-E) junction of the transistor 27 which induces a current in the collector (C) of the transistor 27. The resistors 25 and 26 and the transistor 27 shown in FIG. 2 form a test switch sensor 28 illustrated in FIG. 1. Once the transistor 27 is turned on, the current source generated at the transistor 27 is approximately twenty to forty milliamps, this current being dependent on the transistor 27 DC beta, or current gain. Acting as a current source, the transistor 27 charges a capacitor 30 through a diode 32 and substantially simultaneously turns on a second transistor 34 through a resistor 36. The capacitor 30, a resistor 38 and a resistor 40 in FIG. 2 form a time constant circuit 42 in FIG. 1, and this circuit 42 will be discussed in more detail hereinafter as part of our explanation of the diminished sensitivity operational mode.

During the mode of testing the operability of the smoke detector 10, an inhibiting means, such as an inhibit control circuit 44 shown in FIG. 1, is used for inhibiting actuation of the mode of [dimished] *diminished* sensitivity to smoke levels. Components of the inhibit control circuit 44 include the resistor 36, a resistor 46 and the transistor 34 shown in FIG. 2. The inhibit control circuit 44 prevents the time constant circuit 42 from activating and controlling operation of the diminished sensitivity mode. In the illustrated embodiment a Darlington transistor 48 (such as, for example, a MPSA12, NPN transistor) acts as a control switch 50 (see FIG. 1) for activation of the diminished sensitivity mode. The control switch 50 functions to determine the current flow to a transistor 56, and along with coupled resistors, acts as a sensitivity control 58 during the [diminishd] *diminished* sensitivity operational mode (to be discussed in detail hereinafter).

During operation of the inhibit control circuit 44, the transistor 34 saturates via the current flow through the resistor 36 and pulls the base B of the transistor 48 to about 100 millivolts. This prevents the transistor 48 from turning on and the emitter E of the transistor 56 floats at a voltage relative to the circuitry. Pin numbered P13 of a smoke detector chip 60 with a voltage comparator portion (such as, a Motorola MC14467-P1) settles to fifty percent of the battery voltage (9 VDC in the illustrated embodiment), or 4.5 VDC at the pin P13. The voltage comparator portion of the chip 60 compares the 4.5 VC at the pin P13 with the voltage at pin P15, which is the input from the ionization chamber collector plate 20. During the testing mode when the switch 12 contacts the container 14, a circuit to ground 62 is completed both through a resistor 64 and to a ground 66 through the container 14. These complete circuits therfore form a voltage divider network with a voltage on the container 14 of about 6.08 VDC, and thus a voltage of approximately four VDC at the collector plate 20. This voltage is dependent on the manufacturer's calibration of the ionization chamber 16. Consequently, in the test mode the 4.0 VDC input from the collector plate 20 to the pin P15 is less than the voltage of 4.5 VDC at the pin P13. This difference in voltage results in the voltage comparator portion of the chip 60 outputting an alarm signal on pin P10 and P11, in conjunction with P8, and also with P5 (LED) to alarm generating means, such as a conventional light emitting diode 61 and a [pieozoelectric] *piezoelectric* horn 68. The horn 68 includes a pieozoelectric ceramic disk (not shown), such as a Kyocera No. KBS-350A-3FCS-2, manufactured by Kyocera, Ltd., Japan. The ceramic disk is mounted in a transducer socket, such as an ATM 7373, manufactured by Molex, Inc., Lisle, Ill. The transducer socket (not shown) provides an audio output in coordination with the [piezolectric] *piezoelectric* disk. In the preferred embodiment this push-to-test operational mode always overrides any other mode of operation, including the normal operating mode and the mode of diminished sensitivity to smoke levels.

In the illustrated embodiment as long as the user maintains the switch 12 in a depressed position in contact with the container 14, the inhibit control circuit 44 is operative, thereby preventing the time constant circuit 42 from controlling the diminished sensitivity mode. Once the user releases the switch 12, current is no longer supplied through the collector C of the transistor 27 to the inhibit control circuit 44. The transistor 34 is also shut off, the time constant circuit 42 now turns on the transistor 48, and the mode of diminished [snesitivity] *sensitivity* to smoke levels becomes operative. In other forms of the invention the diminished sensitivity mode can be actuated independently of the testing mode while still using only one button or switch. This could be accomplished, for example, by a simple timing circuit such that a momentary depression of the switch 12 actuates the diminished sensitivity mode but requires a substantially longer contact time to enter the test mode. In the illustrated embodiment the time constant circuit 42 sets a time period of about thirteen minutes for operation of the diminished sensitivity mode. The time constant circuit 42 supplies a current to the base B of the transistor 48. Preferably, the capacitor 30 of the time constant circuit 42 is a high quality, [low-leakge] *low-leakage* electrolytic capacitor which assures an accurate time period when using high resistance values for the resistors 38 and 40 of the time constant circuit 42. During operation of the time constant circuit 42, the diode 32 blocks the discharge to ground of the capacitor 30 back through the resistors 36 and 46 and through the transistors 34.

Once the time constant circuit 42 is actuated, approximately 0.9 microamps initially flows into the base—emitter (B-E) junction of the transistor 48,causing [its saturation with] *it to saturate with current supplied by* the components connected to the collector C, such as resistors 70 and 72 and the transistor 56. As indicated hereinbefore, the transistor 48 is also the control switch 50 (see FIG. 1) which outputs a control signal via its saturation to control current flow to the transistor 56 (also the sensitivity control 58). When the transistor 48 is conducting, the transistor 56 acts as an emitter—follower based on the voltage divider ratio established by the resistors 70 and 72. In the [emobodiment] *embodiment* of FIG. 2, the voltage divider ratio is such that the transistor 48 saturates at about 0.5 VDC, causing a potential of about 2.5 VDC to be placed at the base B of the transistor 56. This locks the emitter E of the transistor 56 at 3.0 VDC when the internal voltage setting resistance ladder and voltage comparator of the chip 60 is strobed on. This resistance ladder has a large impedance (about 1 megaohm) which appears as a current source to the transistor 56, and thus the [resistance ladder] *transistor 56* easily clamps the input pin P13 of the voltage comparator portion of the chip 60 to about 3.0 VDC (roughly ⅓ the voltage of the battery 22). When the control switch 48 is not on, the emitter E of the transistor 56 floats; and the voltage at pin P13 returns to about half of the voltage of the battery 22 when the chip 60 strobes on. This voltage level of 3.0 VDC for the pin P13 corresponds to about a three percent smoke obscuration level in the ionization chamber 16 for the following conditions: the buffered [collection plate] *collector plate 20* voltage is plotted against smoke obscuration level in a smoke box (see FIG. 4) with approximately thirty-four feet per minute air flow, and the initial voltage of the collector plate 20 is set to about 5.74 VDC. During normal sensitivity operation a predetermined smoke level for alarm signal generation is about one and a half percent smoke obscuration (also known as optical smoke density) *which is conventionally defined in % obscuration per foot*. During the mode of diminshed sensitivity to smoke levels, an alarm signal will be generated if the smoke level in the ionization chamber 16 exceeds the increased predetermined smoke level of three percent obscuration, corresponding to changing the voltage on the collector plate 20 to less than 3.0 VDC. This smoke signal is input to pin P15 of the voltage comparator portion of the chip 60 and compared with the voltage pin P13. This setting is for light to moderate smoke levels and suppresses alarms associated with various user generated conditions, such as, for example, at least one of cooking smoke, fireplace smoke, excessive water vapor from bath facilities and from persons smoking cigarettes, cigars or pipes. In another form of the invention the user can select different sensitivity levels through the sensitivity control 58 which can include selectable different ones of the transistors 56 or resistors, such as the resistors 70 and 72.

Figure 5:
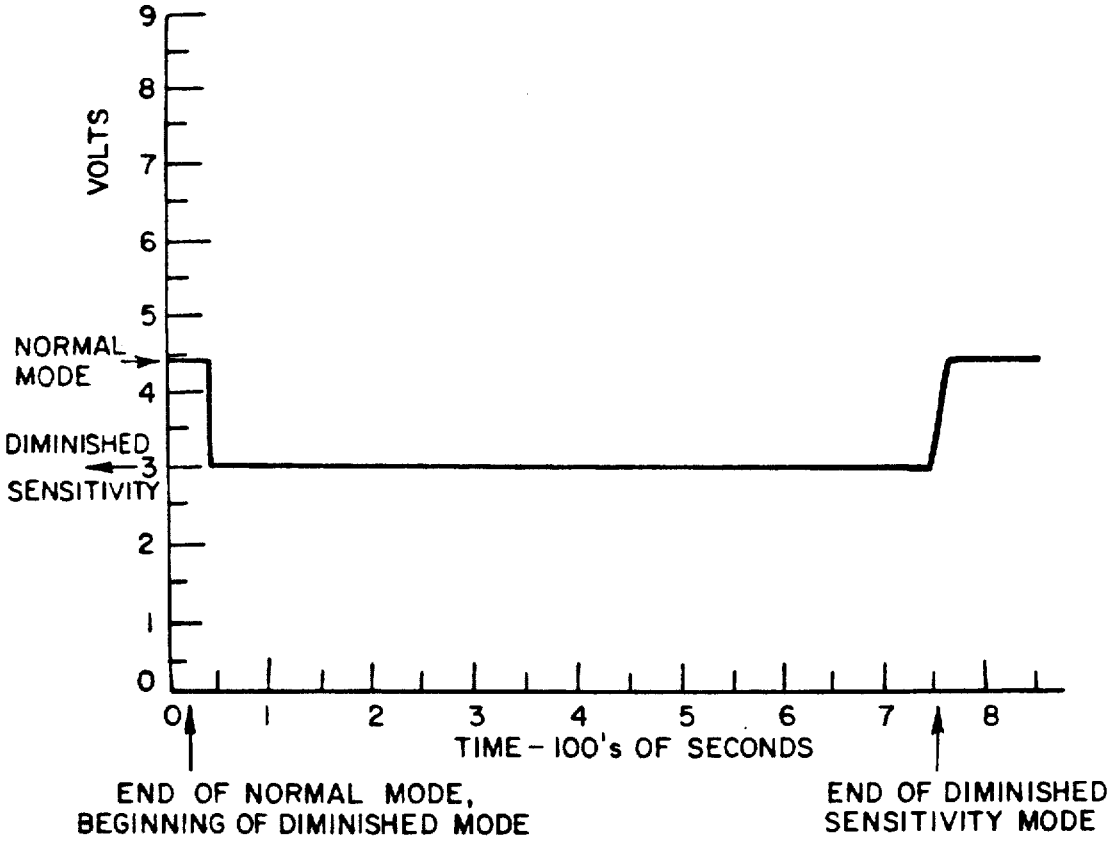
FIG. 5 shows sensitivity level of a transistor during both normal and diminished sensitivity modes of operation.

At the end of the thirteen minute time period, dictated by the time constant circuit 42, the capacitor 30 has discharged sufficiently to cause the transistor 48 to turn off. The base junction B of the transistor 56 is then pulled positive to the supply. The changeover from the diminished sensitivity to the normal sensitivity smoke detector mode occurs rapidly as illustrated in FIG. 3. In this figure the voltage at the collector C of the transistor 48 is the control signal. The voltage behavior in FIG. 3 does give a relative measure of the behavior of the sensitivity and is plotted over a small part of the normal mode and over the temporary time period of the diminished sensitivity mode. At the end of this temporary time period the voltage for the transistor, 48 shows a rapid decay, or a change from saturation to cut-off. This rapid decay arises from the use of an [appropirate] *appropriate* diminishing means, which in the illustrated embodiment is amplifying means, such as the transistor 48, and comprises the operating feature of having a small current input, a large gain and a [small gain] *small current* output. As noted in a relative manner in FIG. 3 the resulting control signal level has a substantially constant magnitude over at least a majority of the temporary time period of operation in the diminished sensitivity mode; and this in [turns] *turn* provides a substantially constant level of diminished sensitivity to smoke levels over the temporary time period. This aspect is illustrated in more quantitative and absolute terms in FIG. 5 which plots the emitter (E) voltage of the transistor 56 over the temporary time period. The change of sensitivity levels is clearly shown as one proceeds from the normal mode at 4.5 VDC to about three volts during the diminished sensitivity mode. This feature of the invention yields a highly reliable smoke sensitivity in the [dminished] *diminished* sensitivity mode and also exhibits a rapid changeover to normal smoke sensitivity levels. At any time the temporary period of diminished sensitivity can be reinstituted by the user again depressing and releasing the switch 12 to start the thirteen minute temporary time period.

Therefore, in accordance with the present invention a smoke detector is provided which includes a number of features having important commercial advantages. A user actuated switch controls both testing of the smoke detector and engagement of an operational mode of diminished sensitivity to smoke levels. The user can override any other operational mode and perform testing of the smoke detector. Once the smoke detector is in the diminished sensitivity mode, the sensitivity to smoke levels is substantially constant over the temporary time period of diminished mode operation, providing a highly reliable smoke detection sensitivity while tolerating user generated conditions, such as cooking smoke or cigarette smoke. At the end of the temporary time period there is a rapid switching back to the normal sensitivity mode of sensing smoke levels.

While preferred embodiments of the present invention have been illustrated and described, it will be understood that changes and modifications may be made therein without departing from the invention in its broader aspects. For example, the invention has been illustrated in terms of a collection of discrete components, but it is contemplated that the circuitry can be readily embodied within an integrated circuit chip. Various features of the invention are defined in the following claims.

What is claimed is:

1. A smoke detector comprising:

means for sensing smoke levels and generating a signal [charcteristic] *characteristic* of said smoke levels;

means for generating an alarm signal responsive to said sensing means detecting a predetermined smoke level;

means for user testing the operability of said smoke detector, said testing means comprising a single user [actuaed] *actuated* element adapted to cause generation of said alarm signal; and means for temporarily diminishing the sensitivity of said smoke detector by increasing in said sensing means the magnitude of said predetermined smoke level causing generation of said alarm signal, said single user element further adapted to actuate said diminishing means.

2. The smoke detector as defined in claim 1 wherein said sensing means comprises at least one of an ionization chamber/radioactive source and a photoelectric sensor system.

3. A smoke detector comprising:

means for sensing smoke levels and generating a signal characteristic of said smoke levels;

means for generating an alarm signal responsive to said sensing means detecting a predetermined smoke level;

means for testing the operability of said smoke detector, said testing means comprising a user actuated element adapted to cause generation of said alarm signal; and means for temporarily diminishing the sensitivity of said smoke detector by increasing in said sensing means said predetermined smoke level causing generation of said alarm signal, said user actuated element further adapted to actuate said diminishing means and said user testing means overriding the operation of said diminishing means during the operation of said testing means.

4. A smoke detector comprising:

means for sensing smoke levels and generating a signal [charcteristic] *characteristic* of said smoke levels;

means for generating an alarm signal responsive to said sensing means detecting a predetermined smoke level;

means for user testing the operability of said smoke detector, said testing means operable by the user for generating an alarm signal output to said alarm signal means; and means for diminishing for a temporary time period the sensitivity of said smoke detector by increasing in said sensing means the magnitude of said predetermined smoke level causing generation of said alarm signal, said diminishing means generating a control signal for establishing the increased magnitude of said predetermined smoke level, and said control signal having a substantially constant magnitude during said temporary time period.

5. A smoke detector comprising:

means for sensing smoke levels and generating a signal [charcteristic] *characteristic* of said smoke levels;

means for generating an alarm signal responsive to said sensing means detecting a predetermined smoke level;

means for user testing the operability of said smoke detector, said testing means operably by the user for generating an alarm signal output to said alarm signal means; and means for diminishing for a temporary time period the sensitivity of said smoke detector by increasing in said sensing means the magnitude of said predetermined smoke level causing generation of said alarm signal, said diminishing means generating a control signal over said temporary time period and said control signal having a slowly changing level until the end of said temporary time period whereupon said control signal decays rapidly causing deactivation of said diminishing means.

6. The smoke detector as defined in claim 5 wherein said diminishing means comprises at least means for amplifying a small current input and having a large gain and small current output.

7. The smoke detector as defined in claim 5 wherein said increased predetermined smoke sensitivity level comprises a moderate smoke level associated with user generated conditions.

8. The smoke detector as defined in claim 7 wherein said user generated conditions comprise at least one of cooking smoke, fireplace smoke, excessive water vapor and persons smoking cigarettes, cigars or pipes.

9. A smoke detector comprising: means for sensing smoke levels and generating a signal [charcteristic] *characteristic* of said smoke levels;

means for generating an alarm signal responsive to said sensing means detecting a predetermined smoke level;

means for user testing the operability of said smoke detector, said testing means comprising a user actuated element adapted to cause generation of said alarm signal;

means for diminishing for a temporary time period the sensitivity of said smoke detector by increasing in said sensing means said predetermined smoke sensitivity level causing generation of said alarm signal, said user element being a single element and adapted to both actuate said diminishing means and operate said testing means; and sensitivity control means for user selection of said increased predetermined smoke level.

10. The smoke detector as defined in claim 9 wherein said alarm signal means comprises a voltage comparator.

11. The smoke detector as defined in claim 10 further including alarm generating means.

12. The smoke detector as defined in claim 11 wherein said alarm generating means comprises a horn and light emitting diode.

13. The apparatus as defined in claim 1 wherein said alarm signal means remains quiet unless user tested or said smoke levels exceed said increased predetermined smoke level during operation of said diminishing means or said smoke levels exceed said predetermined smoke level during the normal operation of said smoke detector.

14. The apparatus as defined in claim 1 further including means for inhibiting operation of said diminishing means for a user selected time period.

15. A smoke detector comprising:

means for sensing smoke levels;

means for generating an alarm signal responsive to said sensing means detecting a predetermined smoke level;

means for user testing the operability of said smoke detector, said testing means comprising a user actuated element adapted to cause generation of said alarm signal; and means for temporarily diminishing the sensitivity of said smoke detector by increasing in said sensing means said predetermined smoke level causing generation of said alarm signal, said user testing means overriding the operation of said diminishing means during the operation of said testing means.

16. A smoke detector having a normal sensitivity level and a moderate sensitivity level, comprising:

means for sensing smoke levels and generating a signal characteristic of said smoke levels;

means for generating an alarm signal responsive to said sensing means detecting a predetermined smoke level;

means for user testing the operability of said smoke detector, said testing means operably by the user for generating an alarm signal output to said alarm signal means; and means for diminishing for a temporary time period the sensitivity of said smoke detector to said moderate sensitivity level for activating said alarm signal, and said [dminishing] *diminishing* means generating a control signal having a slowly changing magnitude during said temporary time period and a rapidly changing magnitude at the end of said temporary time period, whereupon the sensitivity of said smoke detector returns to said normal level.

17. A smoke detector comprising:

means for sensing smoke levels and generating a signal characteristic of said smoke levels;

means for generating an alarm signal responsive to said sensing means detecting a predetermined smoke level;

means for user testing the operability of said smoke detector, said testing means comprising a user actuated element adapted to cause generation of said alarm signal;

means for diminishing for a temporary time period the sensitivity of said smoke detector by increasing in said sensing means said predetermined smoke sensitivity level causing generation of said alarm signal, said user element being a single element and adapted to both actuate said diminishing means and operate said testing means; and sensitivity control means for user selection of said increased predetermined smoke level.

18. *A smoke detector comprising:*

*means for sensing smoke levels and generating a signal characteristic of said smoke levels;*

*means for generating an alarm signal responsive to said sensing means detecting a predetermined smoke level; and*

*means for diminishing for a temporary time period the sensitivity of said smoke detector by increasing in said sensing means the magnitude of said predetermined smoke level required for generation of said alarm signal, said smoke detector remaining reliably operative throughout substantially the entire duration of said temporary time period.*

*19. The smoke detector of claim 18 wherein said predetermined smoke level is about 1.5% smoke obscuration.*

*20. The smoke detector of claim 18 wherein said increased smoke level is about 3.0% smoke obscuration.*

*21. The smoke detector of claim 18 wherein said increased smoke level is about twice said predetermined smoke level.*

*22. The smoke detector of claim 18 wherein said increased smoke level is higher than that typically resulting from cooking, fireplace use, excessive water vapor from bath facilities or use of tobacco products.*

*23. The smoke detector of claim 18 wherein said diminishing means generates a control signal to establish said increased smoke level, said control signal being substantially constant throughout generally the entire duration of said temporary diminished sensitivity time period.*

*24. The smoke detector of claim 18 wherein said diminishing means generates a control signal to establish said increased smoke level, said control signal being substantially constant throughout an initial portion of said temporary diminished sensitivity time period.*

*25. A smoke detector comprising:*

*means for sensing smoke levels and generating a signal characteristic of said smoke levels;*

*means for generating an alarm signal responsive to said sensing means detecting a first predetermined smoke level; and*

*means for diminishing for a temporary time period the sensitivity of said smoke detector by increasing in said sensing means the magnitude of said smoke level required for generation of said alarm signal to a second predetermined smoke level, said second predetermined smoke level being a moderate smoke level which is higher than said first predetermined smoke level whereby said smoke detector remains reliably operative throughout substantially the entire duration of said temporary diminished sensitivity time period.*

*26. The smoke detector of claim 25 wherein said first predetermined smoke level is about 1.5% smoke obscuration.*

*27. The smoke detector of claim 25 wherein said second predetermined smoke level is about 3.0% smoke obscuration.*

*28. The smoke detector of claim 25 wherein said first predetermined smoke level is about one-half said second predetermined smoke level.*

*29. The smoke detector of claim 25 wherein said first predetermined smoke level is about 1.5% smoke obscuration and said second predetermined smoke level is about 3.0% smoke obscuration.*

*30. The smoke detector of claim 25 wherein said moderate smoke level is a higher smoke level than that typically resulting from cooking, fireplace use, excessive water vapor from bath facilities or use of tobacco products.*

*31. The smoke detector of claim 25 wherein said diminishing means generates a control signal to establish said second predetermined smoke level, said control signal being substantially constant throughout generally the entire duration of said temporary diminished sensitivity time period.*

*32. The smoke detector of claim 25 wherein said diminishing means generates a control signal to establish said second predetermined smoke level, said control signal being substantially constant throughout an initial portion of said temporary diminished sensitivity time period.*

*33. The smoke detector of claim 32 further including means for user testing the operability of said smoke detector, both said user testing means and said diminishing means being operable by a single user actuated element.*

*34. A smoke detector comprising:*

*means for sensing smoke levels and generating a signal characteristic of said smoke levels;*

*means for generating an alarm signal responsive to said sensing means detecting a first predetermined smoke level;*

*means for diminishing for a temporary time period the sensitivity of said smoke detector by increasing the magnitude of said smoke level required for generation of said alarm signal from said first predetermined smoke level to a second predetermined smoke level that is higher than said first predetermined smoke level; and*

*means for user testing the operability of said smoke detector, said user testing means being operative throughout substantially the entire duration of said time period while said diminishing means is operative.*

*35. The smoke detector of claim 34 wherein said second predetermined smoke level is a moderate smoke level higher than that typically resulting from cooking, fireplace use, excessive water vapor from bath facilities or use of tobacco products.*

*36. The smoke detector of claim 34 wherein both said diminishing means and said user testing means are operable by a single user actuated element.*

*37. The smoke detector of claim 34 wherein the sensitivity of said smoke detector remains reliable throughout substantially the entire duration of said diminished sensitivity time period.*

*38. The smoke detector of claim 34 wherein said diminishing means generates a control signal, said control signal having a substantially constant magnitude throughout the entire duration of said diminished sensitivity time period, whereby, responsive to said control signal, the sensitivity of said smoke detector remains substantially constant during said diminished sensitivity time period.*

* * * * *

UNITED STATES PATENT AND TRADEMARK OFFICE

CERTIFICATE OF CORRECTION

PATENT NO. : RE 33,920 C1
APPLICATION NO. : 90/007175
DATED : May 13, 2008
INVENTOR(S) : William P. Tanguay et al.

It is certified that error appears in the above-identified patent and that said Letters Patent is hereby corrected as shown below:

Title Page, Item (10) Number: "US RE33,920 F1" should read --US RE33,920 C1--.

Signed and Sealed this

Ninth Day of December, 2008

JON W. DUDAS
*Director of the United States Patent and Trademark Office*

US00RE33920F1

(12) EX PARTE REEXAMINATION CERTIFICATE (6224th)

United States Patent

Tanguay et al.

(10) Number: US RE33,920 F1

(45) Certificate Issued: May 13, 2008

(54) SMOKE DETECTOR HAVING VARIABLE LEVEL SENSITIVITY

(75) Inventors: William P. Tanguay, Downers Grove, IL (US); James McCrink, Lisle, IL (US)

(73) Assignee: Maple Chase Company, Downer's Grove, IL (US)

Reexamination Request:
No. 90/007,175, Aug. 16, 2004

Reexamination Certificate for:

| | |
|---|---|
| Patent No.: | **Re.33,920** |
| Issued: | **May 12, 1992** |
| Appl. No.: | **07/390,713** |
| Filed: | **Jul. 11, 1989** |

Related U.S. Patent Documents

Reissue of:

| | |
|---|---|
| (64) Patent No.: | **4,792,797** |
| Issued: | **Dec. 20, 1988** |
| Appl. No.: | **07/022,099** |
| Filed: | **Mar. 5, 1987** |

(51) Int. Cl.

| | |
|---|---|
| ***G08B 17/10*** | (2006.01) |
| ***G08B 29/14*** | (2006.01) |
| ***G08B 29/00*** | (2006.01) |

(52) U.S. Cl. ..... 340/628; 340/577; 340/629

(58) Field of Classification Search ..... None
See application file for complete search history.

(56) References Cited

U.S. PATENT DOCUMENTS

| | | | |
|---|---|---|---|
| 4,097,850 | A | 6/1978 | Conforti |
| 4,101,785 | A | 7/1978 | Malinowski |
| 4,144,459 | A | 3/1979 | Malinowski |
| 4,313,110 | A | 1/1982 | Subulak et al. |
| 4,336,455 | A | 6/1982 | Bryant |
| 4,845,474 | A | 7/1989 | Moore et al. |

OTHER PUBLICATIONS

MC 14466 specification sheets, Motorola Semiconductors, Inc., 1980.

MC 14467 specification sheets, Motorola Semiconductors, Inc., 1984.

Lifesaver Owners Manual Model 0906, Fyrnetics Inc., Sep. 1986.

Single and Multiple Station Smoke Detectors—UL 217, Underwriters Laboratories, Inc., Mar. 21, 1986, p. 28.

*Primary Examiner*—Margaret Rubin

(57) ABSTRACT

A smoke detector having variable sensitivity to smoke levels and using one button both to test the smoke detector and actuate a mode of diminished sensitivity to smoke levels. The smoke detector is operable in a normal sensitivity mode and a diminished sensitivity mode with rapid switching between the modes. The sensitivity to smoke levels is substantially constant when in either the normal or diminished sensitivity mode.

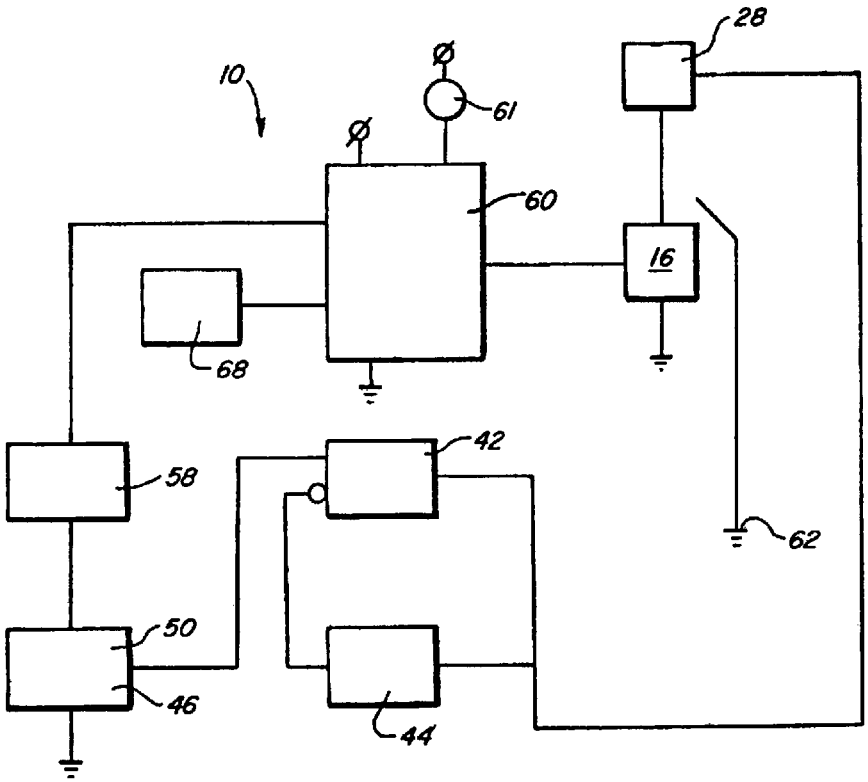

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–17, 23, 24 and 31–38 is confirmed.

Claims 18–22 and 25–30 are cancelled.

* * * * *